J. C. EDWARDS.
AUTOMOBILE CHAIN.
APPLICATION FILED APR. 15, 1922.
1,429,853.
Patented Sept. 19, 1922.
2 SHEETS—SHEET 1.
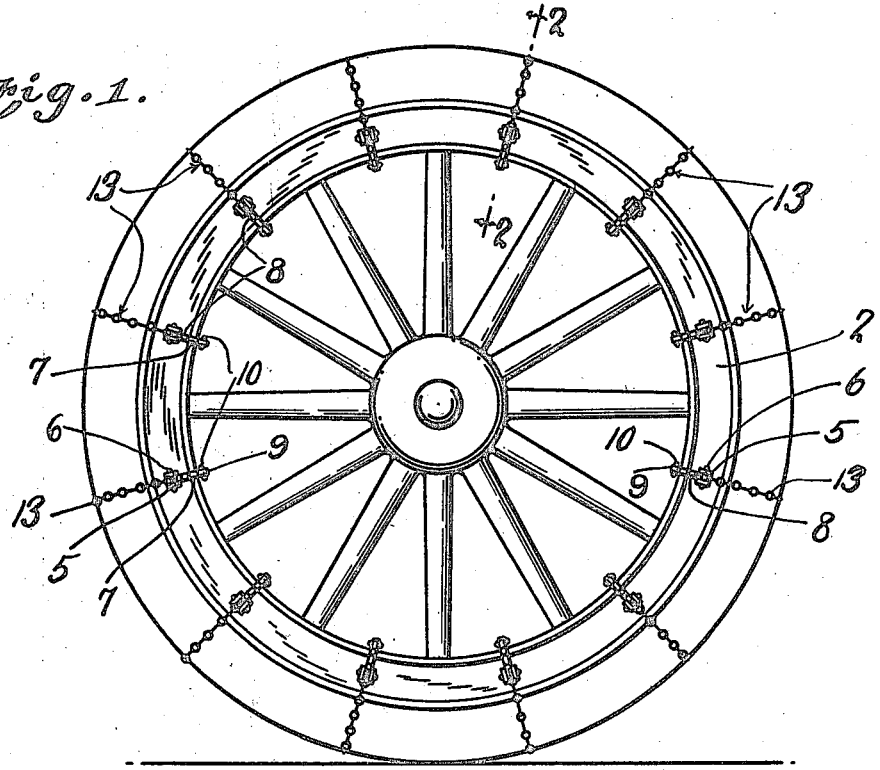
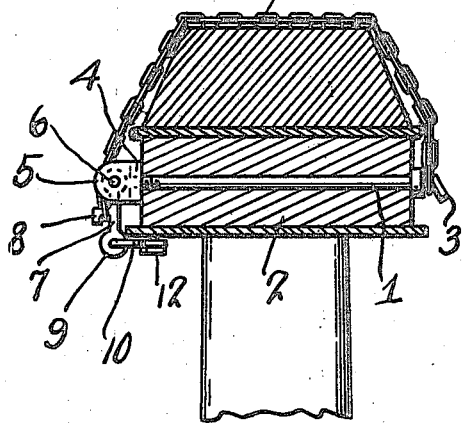
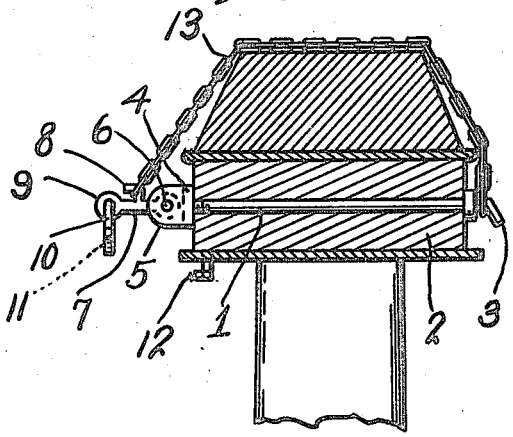
WITNESS:
L. B. James
L. B. Middleton
J. C. Edwards
INVENTOR
BY Victor J. Evans
ATTORNEY J. C. EDWARDS.
AUTOMOBILE CHAIN.
APPLICATION FILED APR. 15, 1922.
1,429,853.
Patented Sept. 19, 1922.
2 SHEETS—SHEET 2.
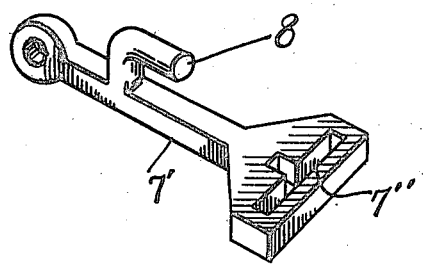
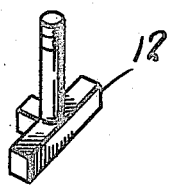
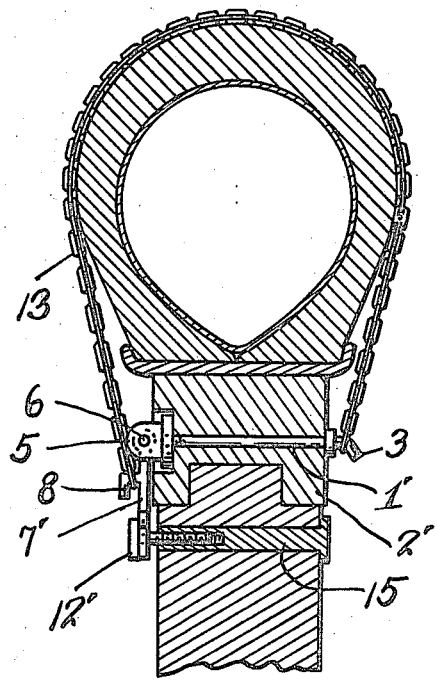
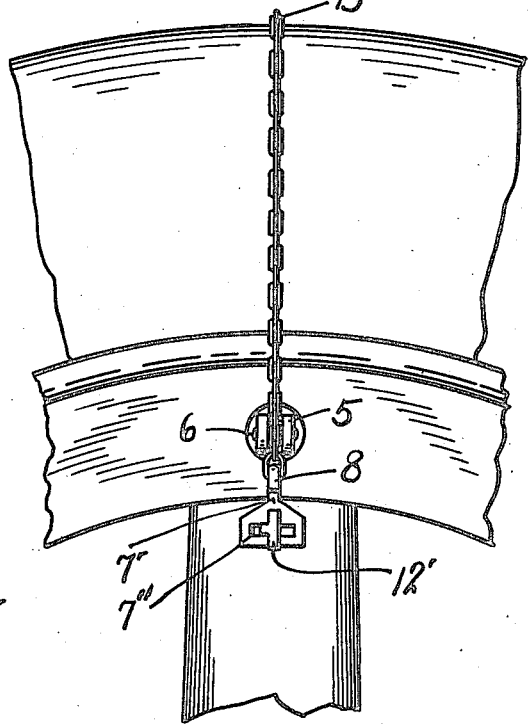
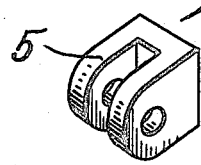
J. C. Edwards
INVENTOR Patented Sept. 19, 1922.

1,429,853

UNITED STATES PATENT OFFICE.

JOHN CHARLES EDWARDS, OF MOUNDSVILLE, WEST VIRGINIA.

AUTOMOBILE CHAIN.

Application filed April 15, 1922. Serial No. 552,950.

*To all whom it may concern:*

Be it known that I, JOHN C. EDWARDS, a citizen of the United States, residing at Moundsville, in the county of Marshall and State of West Virginia, have invented new and useful Improvements in Automobile Chains, of which the following is a specification.

This invention relates to anti-skid means for the wheels of motor vehicles, the general object of the invention being to provide a plurality of cross chains, with means for detachably connecting them with the wheels of the vehicle so that as many cross chains may be used as desired or necessary.

Another object of the invention is to provide means for locking each chain to the wheel.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of a wheel showing the invention in use.

Figure 2 is a section on line 2—2 of Figure 1 showing the parts in locked position.

Figure 3 is a similar view with the parts in unlocked position.

Figures 4 and 5 are detail views.

Figures 6, 7 and 8 are views showing the invention as used on a wheel equipped with a pneumatic tire.

Referring to Figures 1 to 5 which show the invention as used upon a solid tire, 1 indicates a plurality of bolts which are passed through the rim 2 of the wheel, each bolt having a stationary hook 3 on its head which is arranged at the inner side of the wheel. A nut 4 engages the screw threaded end of each bolt, each nut being provided with a pair of spaced ears 5 which are perforated to receive the pivots 6 which pass through an eye in the link 7 so that said link is pivotally secured to the nut. Each link is provided with a hook 8 intermediate its ends and with an eye 9 at its outer end. A headed link 10 has its eye part engaging the eye 9 and the head of this link 10 is provided with a key-shaped slot 11 for engaging the T-shaped head of a set screw 12 which is placed in the rim 2. The cross chains 13 may be of the type which are now in use and which are secured to side chains.

In using the invention one end of the chain is placed over hook 3 and then the chain is brought around the tire and its other end placed over the hook 8, the link 7 being swung upwardly, as shown in Figure 3. The link 7 is then swung downwardly and the slot 11 of link 10 placed over the head of the set screw and then said set screw is turned to lock the parts in closed position. Thus the chain will be stretched over the tire and it will be securely held in place and cannot be removed until the set screw is turned to permit the link to be freed thereof.

It will thus be seen that the cross chains are independent of each other and that they can be placed in position upon that part of the tire which is out of engagement with the ground. As many of these chains may be used as desired or necessary. They can be easily put on and taken off without jacking the wheel and if a chain should break it is only necessary to buy another one and not an entire set.

When the invention is used upon a pneumatic tire, as shown in Figures 6, 7 and 8, the rods 1' are placed in the wood rim 2' as before but the link 10 is omitted and the link 7' is connected directly with the set screw 12' by having its head provided with a T-shaped slot 7" for engaging the T-shaped head of the set screw. In this case also the set screw engages a screw threaded socket in a member 15 which may be carried by a spoke of the wheel. In other respects this form of the invention is similar to that above described.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. Anti-skid means for a vehicle comprising a number of cross chains, a plurality of rods passing through the rim of the wheel, a stationary hook at one end of each rod for receiving one end of each chain, a member pivoted to the other end of each rod, a hook thereon for receiving the other end of a chain and means for locking the pivoted member to the wheel.

2. Anti-skid means for a vehicle comprising a number of cross chains, a plurality of rods passing through the rim of the wheel, a stationary hook at one end of each rod for receiving one end of each chain, a member pivoted to the other end of each rod, a hook thereon for receiving the other end of a chain, means for locking the pivoted member to the wheel, such means consisting of a set screw and a part carried by the pivoted member for engaging the head of the set screw.

3. Anti-skid means for a vehicle wheel comprising a plurality of cross chains, a plurality of rods passing through the rim of the wheel, a stationary hook on one end of the rod for receiving one end of the cross chain, a nut on the other end of each rod, a hook carrying member pivotally secured to the nut, the hook engaging the other end of a chain, a plurality of set screws carried by the wheel and means associated with each pivoted member for engaging the head of a set screw to hold the said member with its hook in holding position.

In testimony whereof I affix my signature.

JOHN CHARLES EDWARDS.